Figure 1:
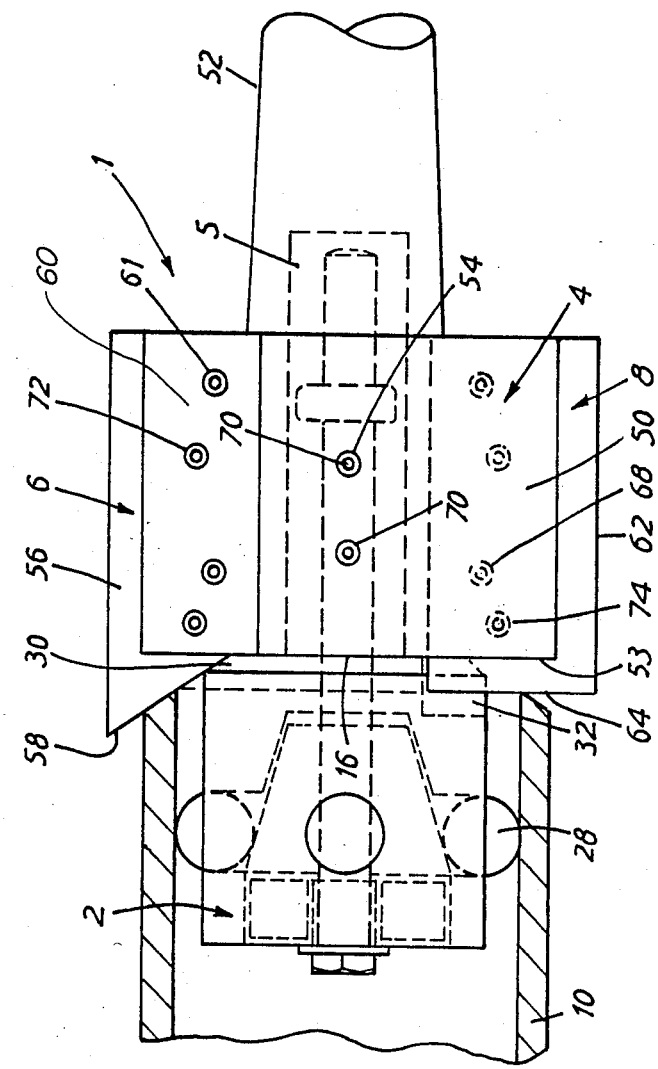

United States Patent [19]

Gill

[11] Patent Number: 4,601,222

[45] Date of Patent: Jul. 22, 1986

[54] TOOL HEAD ASSEMBLY

[75] Inventor: William A. Gill, Erskine, Scotland

[73] Assignee: Babcock Power Limited, London, England

[21] Appl. No.: 705,352

[22] Filed: Feb. 25, 1985

[30] Foreign Application Priority Data

Feb. 24, 1984 [GB] United Kingdom ............... 8404922

[51] Int. Cl.⁴ ............................................. B23B 5/16
[52] U.S. Cl. ...................................... 82/4 C; 144/205; 408/82; 408/211
[58] Field of Search ................... 408/82, 211, 22, 1 R; 279/2 R; 144/205; 82/4 C

[56] References Cited

U.S. PATENT DOCUMENTS

| | | | |
|---|---|---|---|
| 1,235,957 | 8/1917 | Bidwell | 279/2 R |
| 2,747,948 | 5/1956 | Jergens | 408/82 X |
| 3,100,117 | 8/1963 | Schneider et al. | 279/2 R X |
| 3,228,268 | 1/1966 | Strout | 408/211 X |
| 3,999,452 | 12/1976 | Larsen | 279/2 R X |
| 4,470,734 | 9/1984 | Miller | 408/82 X |

Primary Examiner—Z. R. Bilinsky
Attorney, Agent, or Firm—Solon B. Kemon

[57] ABSTRACT

A tool head assembly for use in preparing a tube for welding including a center pilot which is rotatable. The center pilot is adapted to enter a bore of a tube to center the tool head assembly by being provided with ball bearings which rotate around the internal surface of the bore of the tube. In addition, the ball bearings are moveable thereby enabling a required operative diameter to be selected which enables the center pilot to enter the bores of a batch of tubes having a range of internal bores. The center pilot is engageable with a tool holder which is connectable to a machine tool. The tool holder also supports a pair of bevelling tools and a facing tool. In use the center pilot is adjusted to the required operative diameter and the rotating center pilot entered into the bore of the tube, which is clamped externally, to facilitate rotation of the ball bearings around the bore of the tube to center the tool head assembly thereby enabling cutting of the surface of the tube into a predetermined shape to be effected, by the bevelling tools and the facing tool, to prepare the tube for welding.

4 Claims, 2 Drawing Figures

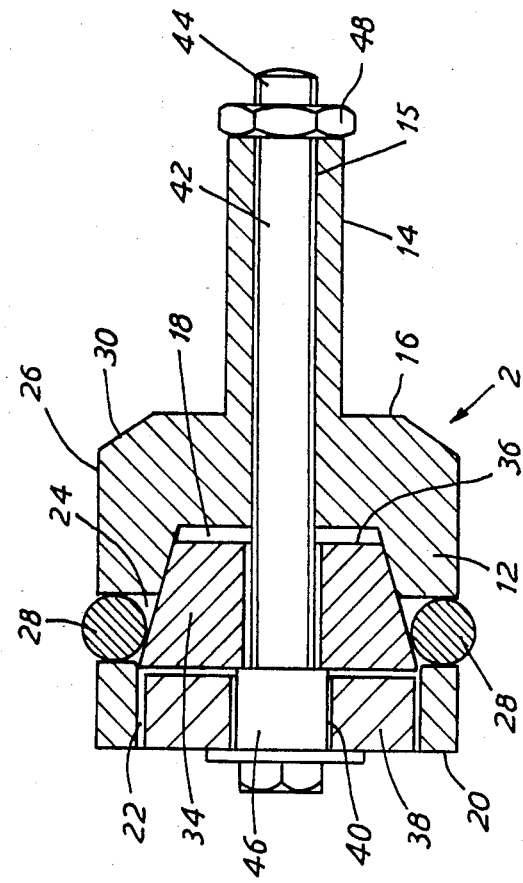

TOOL HEAD ASSEMBLY

This invention relates to a tool head assembly for preparing a tube for welding and more especially to a tube head assembly for use with a tube which is secured externally in order to effect preparation for welding.

According to the invention there is provided a tool head assembly for preparing a tube for welding which tool head assembly includes a rotatable centre pilot adapted to enter a bore of a tube and to centre the tool head assembly, the rotatable centre pilot being provided with a rotatable means rotatable relative to the centre pilot and adjustable to a required operative diameter, the rotatable centre pilot being engageable with a support which is connectabel to a machine tool, and at least one cutting tool for cutting into a surface of the tube which tool is connectable to the support, whereby the rotatable means are adjusted to the required operative diameter and the rotating centre pilot entered into the bore of the tube to facilitate rotation of the rotatable means around the bore of the tube to centre the tool assembly thereby enabling cutting of the surface of the tube into a predetermined shape to be effected by the at least one cutting tool to prepare the tube for welding.

The invention will now be described, by way of example, and with reference to the accompanying, partially diagrammatic, drawings in which:

FIG. 1 is a part sectional elevation of a tool head assembly shown with a rotatable centre pilot of the tool head assembly inserted into a tube; and FIG. 2 is a cross sectional elevation of the rotatable centre pilot shown in FIG. 1;

As shown in the drawings a tool head assembly 1 made of steel comprises a rotatable centre pilot 2, a rotatable tool holder 4, two rotatable bevelling tools 6 only one of which is shown and a rotatable facing tool 8 which are connected together and the assembly 1 mounted on a machine tool (not shown) so that the rotating centre pilot 2 is capable of being introduced, as is illustrated, into an internal bore of an externally secured tube 10, and so that the tools 6 and 8 may cut into peripheral surfaces of the tube 10 to prepare the tube 10 for welding.

The centre pilot 2 includes a cylindrical housing 12 having a shank 14 extending from an end 16 thereof. A cylindrical threaded aperture 15 extends coaxially with a central axis of the shank 14 and into the cylindrical housing 12 where the aperture 15 merges into a frustro conical cavity 18 of greater diameter than the aperture 15. The wall of the cavity 18 diverges away from the aperture 15 and the wall of the cavity 18 adjacent a leading surface 20 of the cylindrical housing 12 merges into a right circular cylindrical portion 22 having a wall extending co-axially of a central axis of the housing 12. Extending radially from the central axis of the housing 12 through the wall of the cavity 18 are four bores 24 which emerge at an outer surface 26 of the cylindrical housing 12. Each bore 24 accommodates a ball bearing 28 moveable within the bores 24 to project beyond the surface 26 or to retract into the cavity 18, and each bore 24 being caulked at the outer end to prevent the ball bearing 28 from falling out of the bore 24. The outer surface 26 of the housing 12 is machined at the end 16 into a bevelled portion 30 whose surfaces diverge away from the central axis of the housing 12. The surfaces are bevelled at an angle of, for example, 52.5°. Extending from the end 16 and through the bevelled portion 30 is a coaxial slot 32 which is capable of accommodating a portion of the facing tool 8.

The centre pilot 2 also includes a frustroconical bearing member 34 having a central bore 36 which extends coaxially with the central axis of the housing 12, the bearing member 34 having outer surfaces which diverge away from the central bore 36, a ball bearing race 38 having a central aperture 40 which extends coaxially with the central axis of the housing 12, and an adjusting bolt 42 having a threaded portion 44 and a flanged collar 46. The ball bearing race 38, the bearing member 34 and the adjusting bolt 42 co-acting together in use to enable the ball bearings 28 to rotate relative to the housing 12.

The centre pilot 2 is assembled by inserting the ball bearings 28 into the bores 24, mating the bearing member 34 with the cavity 18 and the positioning the ball race 38 within the cylindrical portion 22 so as to abut against an end of the bearing member 34 remote from the aperture 15. The threaded portion 44 of the adjusting bolt 42 is then inserted through the aperture 40 and the bore 36 to mate with the threaded aperture 15. The adjusting bolt is then rotated to engage the collar 46 within the aperture 40, and the adjusting bolt 42 secured by a locking nut 48. The centre pilot 2 is adjusted to a required operative diameter by removing the locking nut 48 and rotating the adjusting bolt 42 to cause the outer surface of the bearing member 34 to bear against each of the ball bearings 28 to a degree sufficient to effect either projection of a portion of each ball bearing from the outer surface 26 or retraction of each ball bearing 28 into the bores 24 and is maintained at a required operative diameter by fixing the position of the adjusting bolt 42 with the locking nut 48. The range within which the operative diameter may be adjusted is dependant upon the diameter of the ball bearings 28 used in the centre pilot 2.

The tool holder 4 includes a cylindrical portion 50 having a stem 52 extending from one end thereof, which stem 52 is machined into a taper such that the stem 52 may be fitted in a chuck of a machine tool (not shown). The cylindrical portion 50 contains a central bore 51 extending coaxially with a central axis of the tool holder 4 from a front face 53 remote from the stem 52 into the cylindrical portion 50. The cylindrical portion 50 also contains three slots (not shown) extending in parallel to a central axis of the tool holder 4 with each of the slots offset such that a side face lies in an axial plane. The slots are positioned at 90° intervals to each other with a 180° space between the first and third slots. In addition the cylindrical portion 50 includes a retaining apertures 54 drilled in the cylindrical portion 50 adjacent each of the slots to connect with each of the slots and also to connect with the central bore 51.

Each of the two bevelling tools 6 only one of which is shown, comprises a cutting member 56 having at one end an obliquely angled cutting edge 58 cut at an angle of, for example, 37.5° for cutting a bevel in a tube end surface and an arcuate flanged portion 60 having apertures 61 therein extending perpendicularly to the cutting edge 58.

The facing tool 8 comprises a cutting member 62 having at one end a cutting surface 64 which extends perpendicularly to the cutting member 62 for cutting the tube end and an arcuate flanged portion having apertures 68 therein extending perependicularly from the cutting member 62.

The tool head assembly 1 is assembled by mating the shank 14 of the centre pilot 2 with the central bore 51 in the tool holder 4 and securing the shank 14 within the central bore 51 with grub screws 70 inserted through the retaining apertures 54 so that the end 16 of the centre pilot 2 abuts against the front face 53 of the tool holder 4. Then each of the bevelling tools 6 are attatched to the tool holder 4 by inserting the cutting members 56 into two of the slots in the tool holder 4 such that a portion of the cutting edge 58 of each cutting member 56 abuts against the bevelled portion 30 of the centre pilot 2. The bevelling tools 6 are then each secured by inserting grub screws 72 into the apertures 61 in the flanged portion 60 to mate with the retaining apertures 54 in tool holder 4. The facing tool 8 is then attached to the tool holder 4 by inserting the cutting member 62 into the remaining slot in the tool holder 4 such that the cutting surface 64 extends into the slot 32 in the centre pilot 2. The facing tool is then secured in place by inserting grub screws 74 into the apertures 68 in the flanged portion to mate with the retaining apertures 54 in the tool holder 4.

In operation, a batch of tubes are selected for preparation for welding the tubes having an internal bore, for example, in the range of 50.8 mm±10% and a centre pilot 2 is selected having an operative diameter which includes the range of 45.8 mm to 55.8 mm. The operative diameter of the centre pilot 2 is then adjusted so that the ball bearings 28 make contact with surfaces of the internal bores of a random selection of tubes in the batch, by way of checking that the correct size of centre pilot has been selected the adjusting bolt 42 is then secured by the locking nut 48. The centre pilot 2 is then secured to the tool holder 4 and the each of the bevelling tools 6 are then secured to the tool holder 4 with each of the cutting edges 58 abutting against the bevelled portion 30 of the centre pilot 2 so that the angle of the bevelling tools is set automatically. The facing tool 8 is then secured to the tool holder 4 with the cutting surface 64 extending into the slot 32 in the centre pilot 2. A tube 10 from the batch is then held in position by securing a clamp (not shown) to an external surface of the tube 10. The tool head assembly 1 is then attached to the machine tool by connecting the stem 52 to the chuck of the machine tool. The tool head assembly 1 is then locked in place and the machine tool energised to rotate the tool head assembly 1 and the rotating centre pilot 2 introduced into an internal bore of the tube 10 as a further check as shown in FIG. 1 so the ball bearings 28 which are rotatable relative to the housing 12 are rotated around the internal surface of the bore of the tube 10 to centre the tool head assembly 1 with respect to the tube 10 and to prevent the tool head assembly 1 from wandering off centre which would cause inaccurate cuts to be made in the external surface of the tube 10. In addition, as the ball bearings 28 are rotatable relative to the housing 12 and are rotated around the internal surface of the bore of the tube 10 during rotation of the centre pilot 2 this helps to prevent scoring of the internal surface of the bore which tends to lead to erroneous results during non-destructive testing of the subsequent weld. The rotating centre pilot 2 is then advanced into the internal bore of the tube 10 in order to effect rotary contact between the bevelling tools 6 and the facing tools 8 and the external peripheral surface of the tube 10. On contact the cutting surfaces 58 and 64 cut into the tube 10 to shape accurately the peripheral surfaces of the tube 10, the accuracy of the centering of the cut being maintained by the rotating centre pilot 2. Once cutting has been achieved the tool head assembly 1 is withdrawn from contact with the tube 10 the tube 10 is then removed, such that the tube 10 may be welded to another similarly prepared tube, and another tube 10 from the batch clamped in position on the machine tool and the operation repeated.

In order to facilitate the operation of introducing of the centre pilot 2 into the remaining tubes in the batch the centre pilot is removed from the tool head assembly 1 connected to the machine tool and inserted into the internal bores of other tubes in the batch and the operative diameter of the centre pilot adjusted to the smallest of the internal bores. The centre pilot is then secured into the tool holder 4 as before so that the cutting surfaces 58 abut against the bevelled portion 30 and so that the cutting surface 64 projects into the slot 32. Due to the alteration of the operative diameter of the centre pilot 2 it may be necessary to reset the position of the facing tool. This is achieved by energising the machine tool, introducing the rotating centre pilot 2 into the internal bore of the tube and advancing the centre pilot 2 into the tube so that the facing tool 6 executes a trial cut in the peripheral surfaces of the tube. If the trial cut is of too great a depth the cutting surface 64 is moved in the slot 32 towards the front face 53 of the tool holder 4 after removal of the grub screws 74. Similarly if the trial cut is too shallow the cutting surface is advanced in the slot 32 towards the leading surface 20 of the centre pilot. Once the correct position of the cutting surface 64 is achieved the facing tool is secured in place by inserting and securing the grub screws as before. The peripheral surfaces of the tube are then cut as described in preceding paragraphs. The adjustment procedure carried out on the operative diameter of the centre pilot is then repeated for the remaining tubes in the batch, progressing to the largest diameter.

It should be noted that for tubes in the batch having internal bores within the range of adjustment of the particular centre pilot selected that although the position of the facing tool 8 may need to be reset the bevelling tools 6 remain in their original set position.

For tubes having internal bores whose diameters fall outside the adjustable range of the operative diameter of the particular centre pilot selected then another centre pilot must be selected having a range of operative diameters which encompasses those diameters. Typical operative diameters for the centre pilots include, for example, operative diameters adjustable within the range of 35 mm to 42.3; 41.3 to 51.2 mm; 50.8 mm to 60.7; and 60.3 to 70.3 mm.

Also in preceding paragraphs although ball bearings have been described as the rotatable adjusting means, other means may be used which posses a spherical or spheroidal surface which is rotatable around the internal surface of the bore of a tube, for example a roller bearing.

I claim:

1. A tool head assembly for preparing a tube for welding which tool head assmebly includes a rotatable center pilot adapted to enter a bore of a tube and to center the tool head assembly, the center pilot including a housing accommodating a multiplicity of ball bearings which are rotatable relative to the housing and which are adjusted to vary an operative diameter of the center pilot to coincide with a bore of the selected tube, the housing having a bevelled portion provided with a surface which diverges away from a central axis of the housing the surface acting as a reference for setting the cutting angle of a bevelling tool by a portion of a cutting edge of the bevelling tool abutting against said surface, said bevelled portion including an axial keyway, a facing tool said keyway keying said facing tool to the center pilot, and a rotatable support on which the bevelling tool and the facing tool are located which support is engaged with the center pilot and connected to a machine tool, whereby the rotating center pilot is entered into the bore of the tube to center the tool head assembly by effecting rotation of the ball bearings by rolling contact with the bore of the tube thereby enabling cutting of a surface of the tube into a predetermined profile of revolution co-axial with the tube to be effected by the bevelling tool and the facing tool to prepare the tube for welding.

2. A tool head assembly as claimed in claim 1, in which the housing accomodates a bearing member which bears against the ball bearings positioned in apertures in the housing, an adjusting means which adjusts the position of the ball bearings relative to the housing, said bearing member and said adjusting means co-acting together to enable the ball bearings to be moved radially with respect to the housing to vary the operative diameter of the center pilot to coincide with the bore of the selected tube, and a bearing race which co-acts with the bearing member and the adjusting means to enable rotation of the ball bearings with respect to the housing.

3. A tool head assembly as claimed in claim 1, in which the support includes a cylindrical portion having a plurality of slots extending in parallel to a central axis of the support, said bevelling tool and said facing tool located in said slots by locating means, a co-axial aperture in which a portion of the center pilot is engaged, and a co-axial stem extending from the cylindrical portion remote from the co-axial aperture, the stem being connected to the machine tool.

4. A tool head assembly as claimed in claim 2, in which the support includes a cylindrical portion having a plurality of slots extending in parallel to a central axis of the support, said bevelling tool and said facing tool located in said slots by locating means, a co-axial aperture in which a portion of the center pilot is engaged, and a co-axial stem extending from the cylindrical portion remote from the co-axial aperture, the stem being connected to the machine tool.

* * * * *